Feb. 13, 1923.

F. N. KAWAMURA

TYPEWRITER CARRIAGE RETURN MECHANISM

Filed Jan. 9, 1920     4 sheets-sheet 2

1,445,597

Inventor

Fred N. Kawamura

By Victor J. Evans

Attorney

Witness

L. B. James

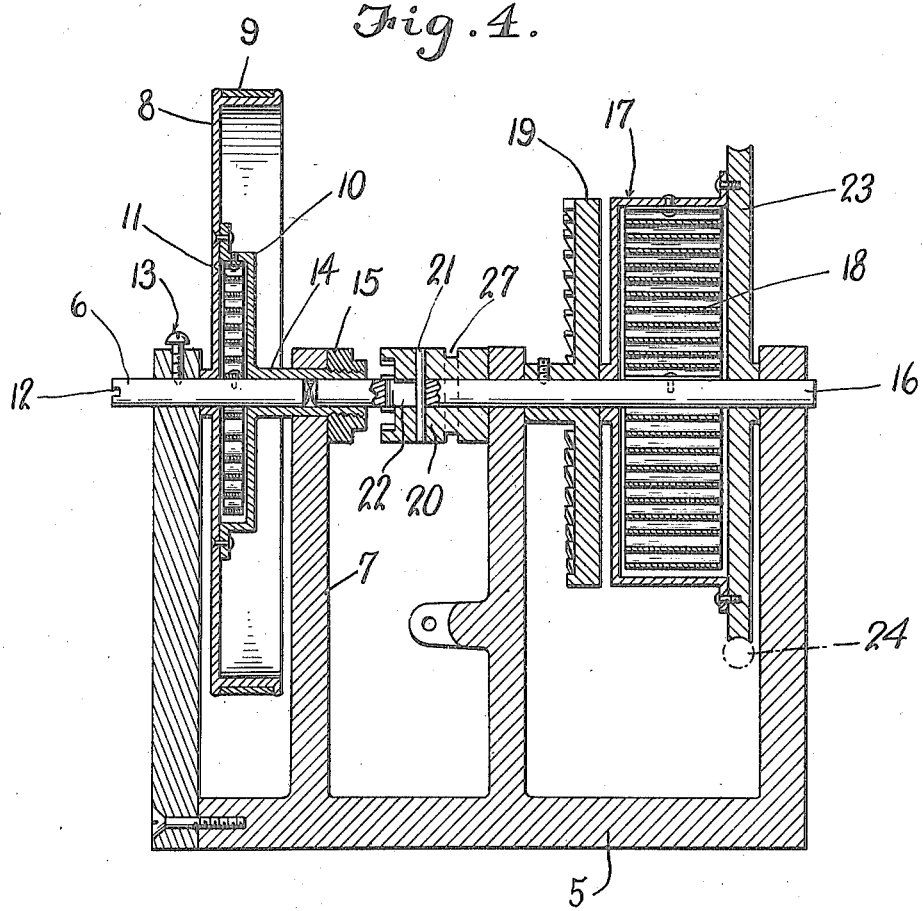
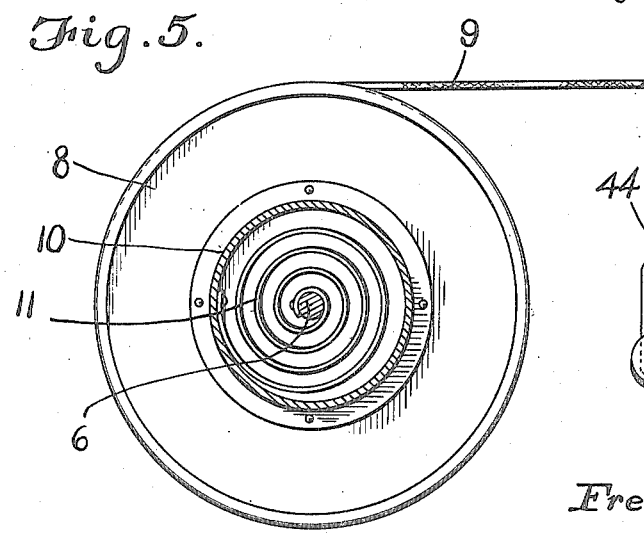
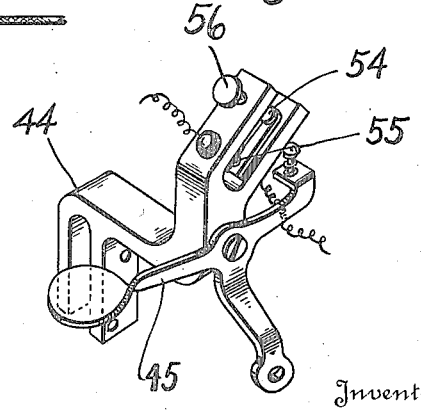

Feb. 13, 1923. 1,445,597
F. N. KAWAMURA
TYPEWRITER CARRIAGE RETURN MECHANISM
Filed Jan. 9, 1920    4 sheets-sheet 4

Inventor
Fred N. Kawamura
By Victor J. Evans
Attorney

Witness
L. B. James

Patented Feb. 13, 1923.

1,445,597

UNITED STATES PATENT OFFICE.

FRED N. KAWAMURA, OF LANDER, WYOMING.

TYPEWRITER-CARRIAGE-RETURN MECHANISM.

Application filed January 9, 1920. Serial No. 350,262.

*To all whom it may concern:*

Be it known that I, FRED N. KAWAMURA, a subject to the Emperor of Japan, residing at Lander, in the county of Fremont and State of Wyoming, have invented new and useful Improvements in Typewriter-Carriage-Return Mechanism, of which the following is a specification.

This invention relates to attachments for typewriters and the principal object of the invention is to provide means for returning the carriage of the typewriter to starting position and to move the platen to space the paper for a new line.

Another object of the invention is to provide a finger operated device for causing said mechanism to return the carriage and operate the platen.

Still another object of the invention is to provide means for actuating the platen when it is desired to write a new line without returning the carriage to its starting position.

Still a further object of the invention is to provide a spring motor for returning the carriage to its starting position and an electric motor for winding the spring of the spring motor.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a rear view showing my invention in use on a typewriter.

Figure 4 is a longitudinal sectional view through the attachment.

Figure 5 is a sectional view of the belt drum of the attachment.

Figure 6 is a perspective view of the finger operated lever for closing the electric circuit.

Figure 1:
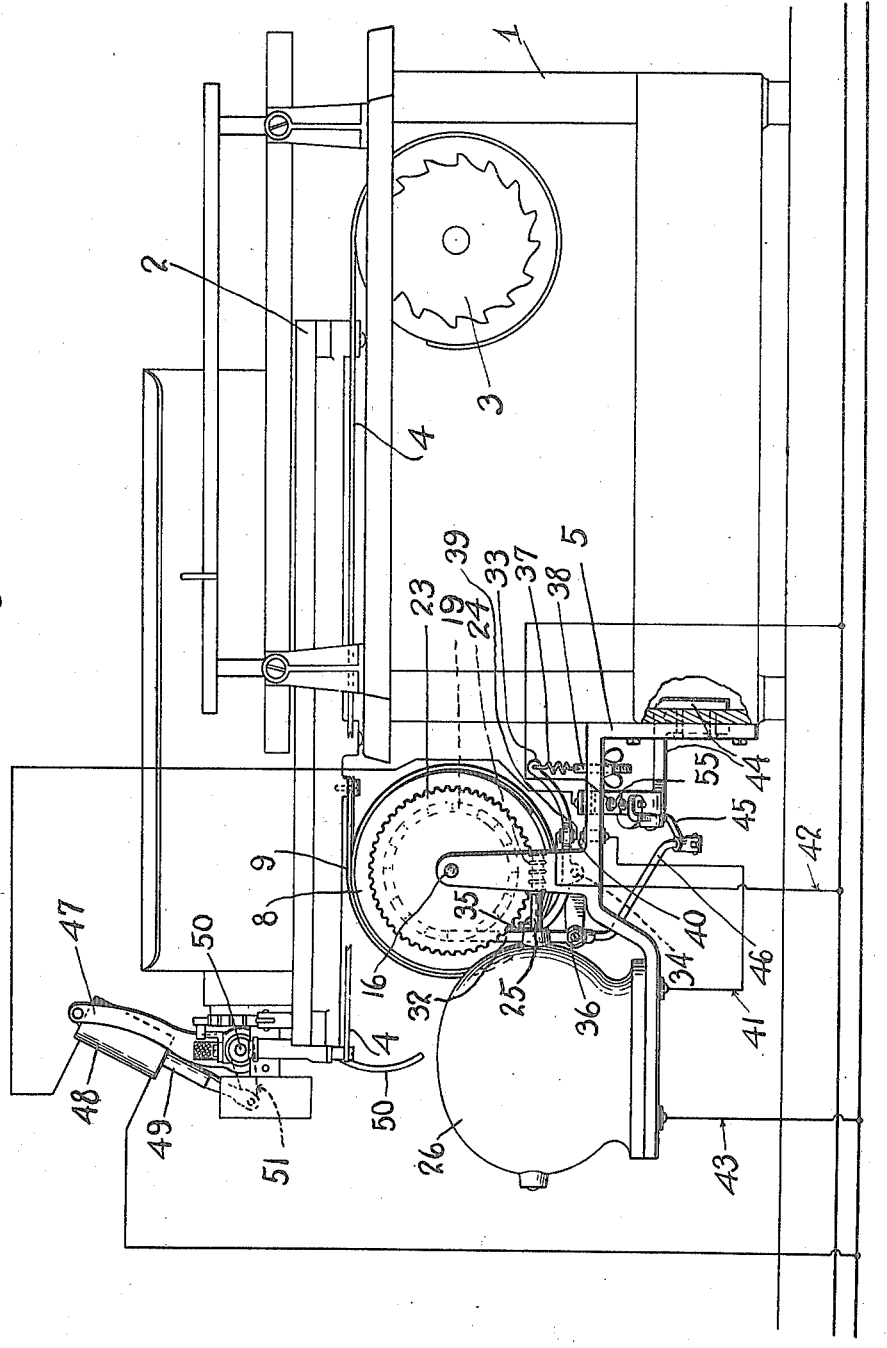
Figure 2:
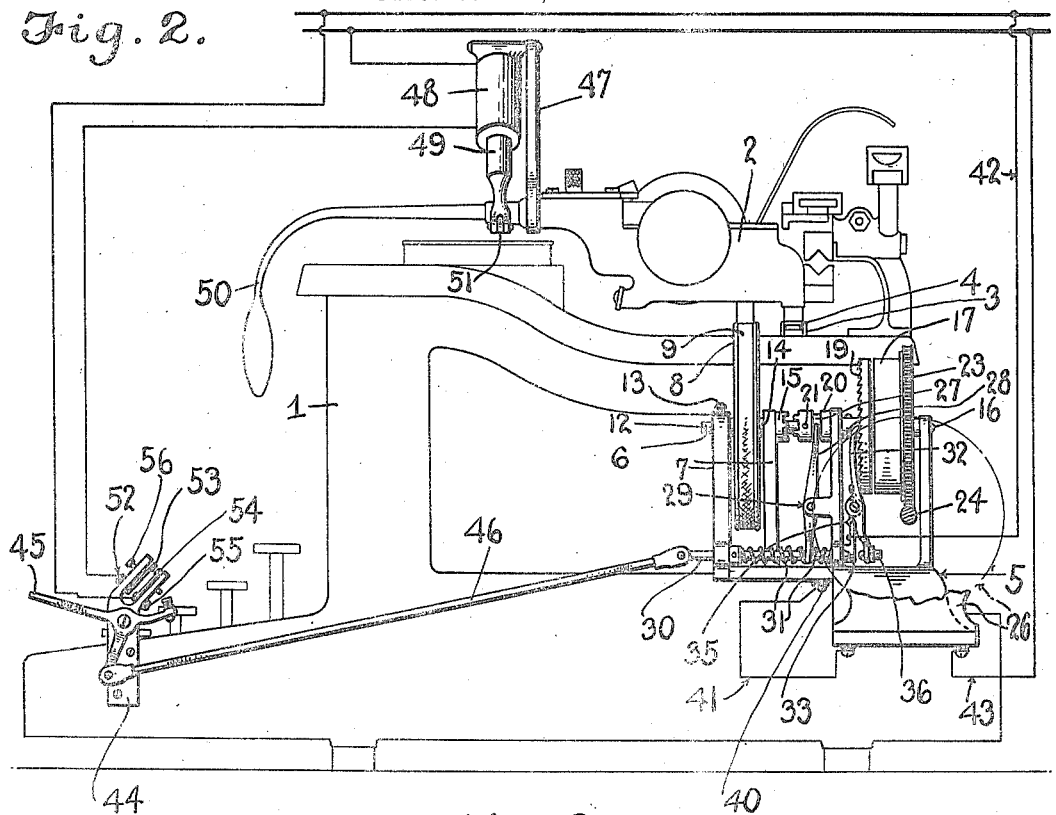
Figure 2 is a side view of a typewriter supplied with my invention.
Figure 3:
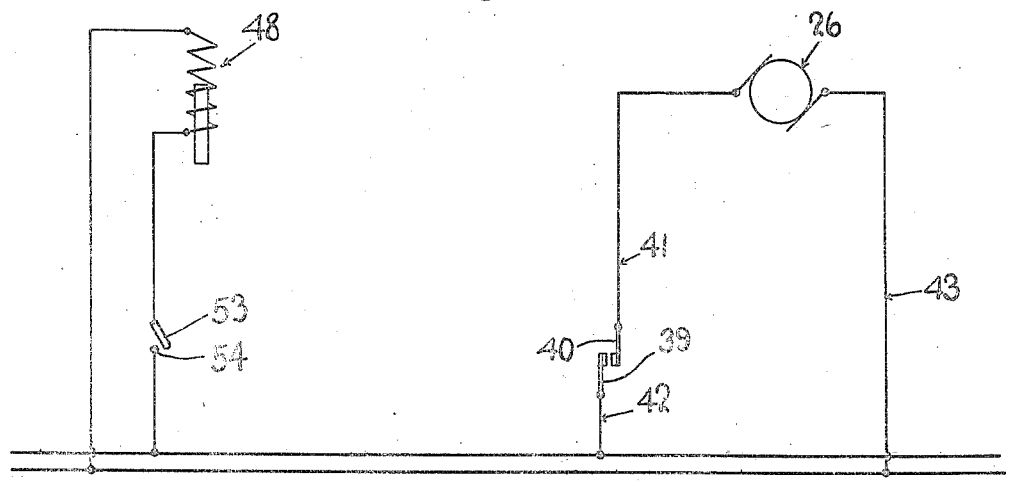
Figure 3 is a diagram of the circuit.
Figure 7:
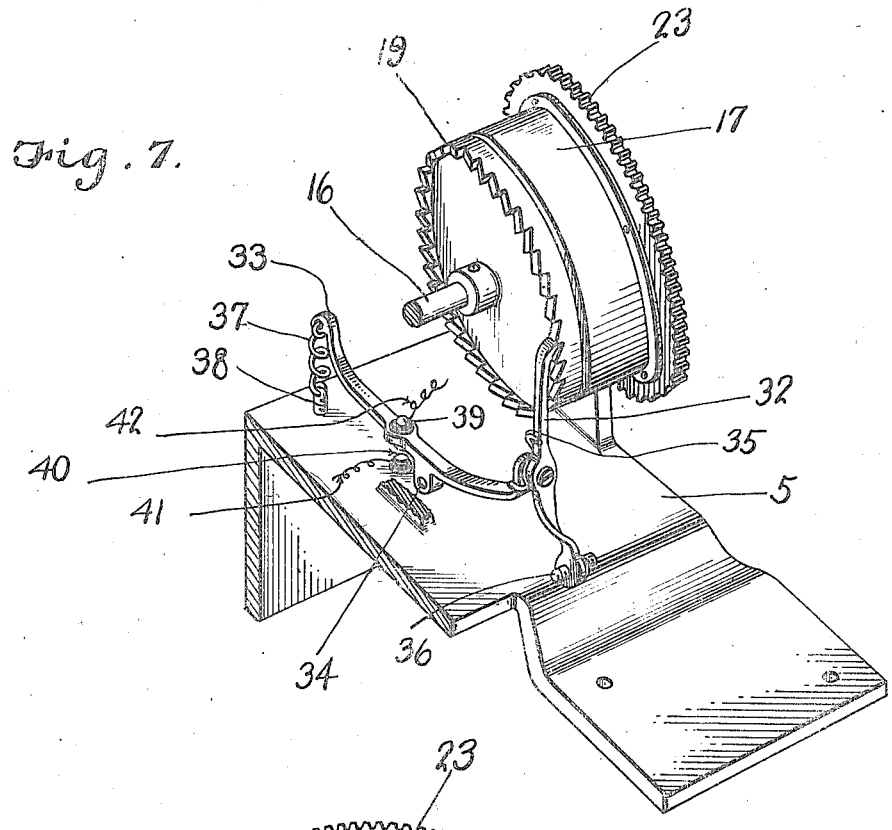

Figure 7 is a perspective view showing the circuit closing means for the electric motor.

Figure 8:
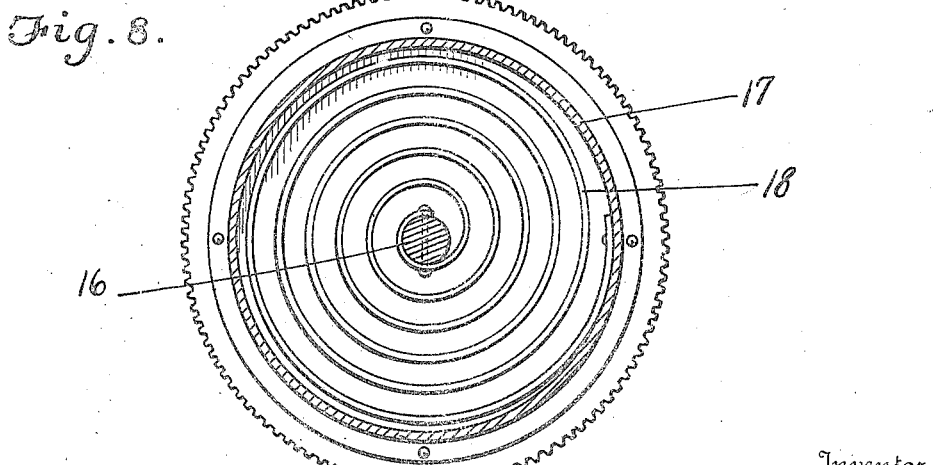

Figure 8 is a sectional view through the spring motor.

In these views 1 indicates the frame of the typewriter, 2 the carriage thereof, 3 the spring drum and 4 the belt carried by the drum and connected with the carriage.

In carrying out my invention I provide a supporting bracket 5 for the parts of the attachment and this bracket is suitably secured to a part of the frame of the typewriter. A trunnion 6 is mounted in a pair of the uprights 7 forming part of the bracket and upon this trunnion is rotatably mounted a drum 8 to which a belt 9 is secured, the other end of the belt 9 being secured to the carriage of the typewriter. This drum carries a spring casing 10 in which is located a coil spring 11 which has one end connected with the trunnion and its other end with the casing. This spring is adapted to be placed under tension by rotating the trunnion by a suitable key which is adapted to engage with the slot 12 formed in the projecting end of said trunnion, the trunnion being normally held against movement by the set screw 13. The tension of this spring is just sufficient to hold the belt 9 taut and will not interfere with the movement of the carriage of the typewriter. A sleeve 14 forms part of the drum and this sleeve surrounds the inner end of the trunnion and projects beyond the same and is journaled in one of the uprights. The projecting end of said sleeve carries a clutch part 15.

A shaft 16 is journaled in the other uprights of the bracket and one end of this shaft extends into the sleeve 14 as shown. This shaft carries a spring motor 17, the spring 18 of which has one end secured to the shaft, the ratchet wheel 19, which is keyed to the shaft and the slidable clutch part 20 which is adapted to engage with the clutch part 15 carried by the sleeve 14. This clutch part 20 is connected with the shaft by the pin 21 engaging the slot 22 in said shaft. A worm gear 23 forms part of the spring motor and this gear is engaged by a worm 24 formed on the motor shaft 25 of the electric motor 26, said motor being supported on the bracket. It will be seen that when the electric motor is in operation the casing of the spring motor will be rotated and thus the spring 18 will be wound up.

The sliding clutch part 20 has a groove 27 thereon which is engaged by the forked end of the lever 28 which is pivoted between ears 29 formed on one of the uprights and the lower end of this lever engages a longitudinally movable rod 30 carried by the bracket, said rod carrying a pair of springs 31 which have their inner ends pressing against opposite sides of the lever so that said lever is yieldingly connected with the rod. The short spring is of greater strength than the other spring so as to normally hold the lever with the clutch in inoperative position but when the rod 30 is pushed inwardly the longer spring will be compressed and thus move the lever to throw the clutch parts into engagement.

The ratchet wheel 19 is engaged by a dog 32 and this dog is pivoted to one end of a lever 33 which is pivoted intermediate its ends to the bracket as at 34. A spring 35 normally holds the dog in engagement with the teeth of the ratchet wheel. The lower end of the dog carries a set screw 36 which is adapted to be engaged by the end of the rod 30 when said rod is pushed inwardly and thus the dog is disengaged from the teeth. The other end of the lever 33 is engaged by a spring 37 and this spring is adjustably secured to the bracket by the bolt 38. The lever 33 also carries a contact 39 which is adapted to engage a contact 40 carried by the bracket. The contact 40 is connected with the contact on the motor by the conductor 41 while the contact 39 is connected with a source of supply by the conductor 42. The other terminal of the motor is connected with the source of supply by the conductor 43.

A bracket 44 is secured to the front part of the frame of the typewriter adjacent the keyboard and a finger lever 45 is pivotally supported by said bracket. One arm of this lever is connected with the rod 30 by the link 46 so that as the lever is depressed by the finger of the operator said rod 30 will be moved longitudinally to first move the clutch lever to throw the clutch parts into engagement with each other and then to throw the dog out of engagement with the ratchet to permit the spring motor to revolve the shaft 16 and thus cause the drum 8 to wind up the belt 9 and so return the carriage to its starting position, it being understood that the spring 18 is stronger than the spring in the drum of the carriage.

A bracket 47 is secured to the carriage of the typewriter and a solenoid 48 is carried by said bracket with the core 49 of the solenoid connected with the platen operating lever 50 of the carriage by the arm 51. These parts are so arranged that when the solenoid is energized its core will rotate the platen lever to space the paper for a new line. The solenoid is connected with a source of supply and with a terminal 52 carried by the bracket 44. This terminal is connected with a spring contact 53 which is adapted to engage with a spring contact 54 carried by the bracket and having its terminal 55 connected with the source of current. Thus when these two spring contacts are pressed together the circuit to the solenoid will be closed and the same energized. One arm of the finger lever 45 is adapted to engage the lower spring contact when the lever is depressed to force said contact against the upper contact to close the circuit and a press button 56 is carried by the bracket 44 and is adapted to force the upper contact against the lower contact to close the circuit to the solenoid.

When the carriage reaches the end of the line or a point where the operator wishes to return it to starting position to start a new line the finger lever is depressed so as to close the circuit to the solenoid to operate the platen to space the paper for a new line and at the same time the rod 30 is moved to throw the clutch and release the dog from the ratchet wheel. This will permit the spring motor to rotate the shaft 16, and as the clutch parts are in engagement, the rotation of the shaft will rotate the drum 8 and thus wind up the belt 9 and draw the carriage to its starting position. While this action is taking place the electric motor will begin to operate to wind up the spring 18 as the circuit to the motor is closed by the engagements of the contacts 39 and 40 due to the rocking of lever 33 by the spring 37. As soon as the finger is removed from the lever the spring will move the dog into engagement with the ratchet wheel and the spring motor will cause said dog to swing the lever 33 upwardly and thus move the contacts 39 and 40 out of engagement and so break the circuit to the motor. This action will take place if the spring of the spring motor is fully wound or approximately so as this spring works against the spring 37 and must be stronger than said spring 37 to lift the lever 33 and thus break the circuit. If the spring of the motor is not wound sufficiently to overcome the spring 37 then the lever 33 remains in its lowered position and the contacts remain in engagement so that the electric motor continues to operate to wind the spring. Thus the action is automatic and the electric motor will continue to operate until the spring in the spring motor is fully wound.

If the operator wishes to space the paper for a new line without changing the position of the carriage it is simply necessary to depress the button 56 to close the circuit to the solenoid 48 so as to rock the platen lever.

The spring 11 in the drum 8 will wind the belt 9 upon said drum when the carriage is being returned by hand and the attachment is not being used.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A typewriter attachment comprising, in combination with a typewriter, a drum, a belt connecting the same with the carriage of the typewriter, a spring motor, a clutch connection between the spring motor and the drum, a ratchet wheel connected with the shaft of the spring motor, a dog engaging said ratchet wheel, manually actuated means for controlling the clutch connection and effecting the release of the dog from the ratchet wheel, means including an electrical motor for rewinding the said spring motor, and a pivoted spring-controlled lever carrying the said dog and connected in circuit with the said electrical motor, said lever being operable upon release of the said dog to close the circuit to the motor.

2. An attachment for typewriters comprising a mechanically operated carriage shifting device, means of operating said shifting device, and an electrically operated line spacing device connected in circuit with the said operating means, said opating means being operable to close the circuit to the said line spacing device simultaneously with the actuation of the said carriage shifting device.

3. An attachment for typewriters comprising a mechanically operated carriage shifting device, means for actuating said shifting device, an electrically operated line spacing device operated from said means simultaneously with the actuation of the said carriage shifting device, said platen shifting device being also operable independently of the carriage shifting device.

4. An attachment for typewriters comprising, a carriage shifting device including a spring motor, electrically operated device for rewinding the spring motor, an electrically operated line spacing device, and means operable for setting the said carriage shifting device in operation and including circuit closing means for automatically closing circuits to the said rewinding and line-spacing devices simultaneously with the setting in operation of the carriage shifting device.

5. An attachment for typewriters comprising a carriage shifting device including a spring motor, an electrically operated device for rewinding the spring motor, an electrically operated line spacing device, and means operable for setting the said carriage shifting device in operation and including circuit closing means for automatically closing circuits to the said rewinding and line spacing devices simultaneously with the setting in operation of the carriage shifting device, said circuit closing means embodying a manually operated element for closing the circuit to the said line spacing device independently of the action of the carriage shifting and rewinding devices.

In testimony whereof I affix my signature.

FRED N. KAWAMURA.